Feb. 21, 1939.  J. GASKELL  2,147,836

APPARATUS FOR MAKING BLOCKS

Filed Feb. 4, 1937

INVENTOR,
Joseph Gaskell,
By Harrison, Kennedy & Campbell,
Attorneys,

Patented Feb. 21, 1939

2,147,836

UNITED STATES PATENT OFFICE 2,147,836

APPARATUS FOR MAKING BLOCKS

Joseph Gaskell, St. Helens, England, assignor to Pilkington Brothers Limited, Liverpool, England, a registered company Application February 4, 1937, Serial No. 123,991
In Great Britain February 5, 1936

1 Claim. (Cl. 25—41)

This invention relates to a process and apparatus for making blocks from pulverulent material and has for its object a process and apparatus for compressing the material into a compact and homogeneous mass.

If pulverulent material is put into a mould and pressure applied to it, this pressure is not fully transmitted through the mass and, consequently, the block formed is less compact at the bottom (assuming the pressure to be applied vertically) than at the top. This is found to be the case whether the pressure applied is steady or is variable, as when the mould is jolted.

According to the invention, the mould walls are movable relatively to both the mould bottom and the mould top and to the material between the bottom and the top, and pressure is applied to the material tending to compress it, while the mould bottom and superincumbent material is jolted. The mould walls may be supported yieldingly, as by springs, relatively to the mould bottom, or means may be provided adapted to limit the movement of the mould walls relative to the mould bottom, the means being adjustable so as successively to alter the limit to the said movement. The mould bottom and superincumbent material may be jolted while the mould walls are maintained in a fixed position relatively to the mould bottom, and then again jolted while the mould walls are free to move into a lower position relative to the mould bottom.

Figure 1:
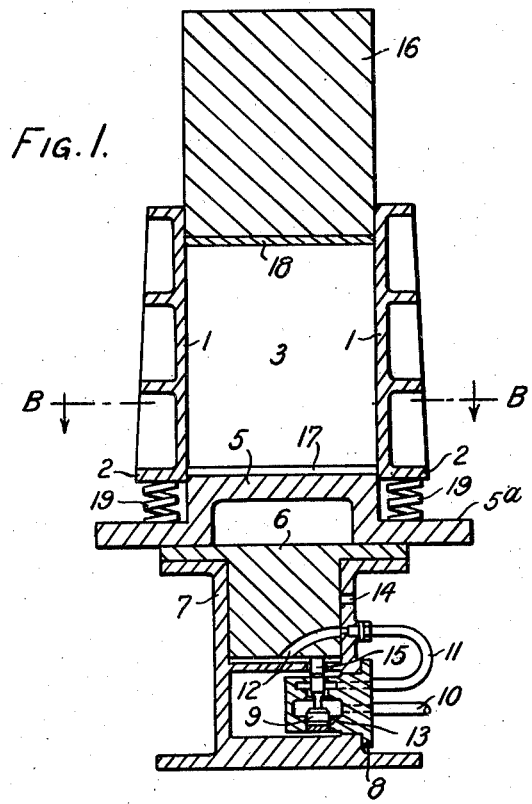
Figure 1 is a vertical section of a block compressing apparatus through the line A—A of Figure 2.
Figure 2:
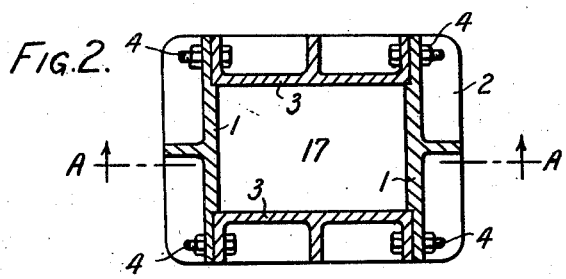
Figure 2 is a horizontal section of the mould through the line B—B of Figure 1.

Referring to the drawing, the mould is composed of two side walls 1 with base 2, and two side walls 3 adapted to be bolted to the side walls 1 by bolts 4. The mould so formed is adapted to slide over the mould bottom 5, with base 5a, which rests on a jolting device of any convenient construction. The jolting device shown, which is of known construction, consists of the piston 6 in the casing 7, with valve box 8 and valve 9. The valve 9 being open, as shown, air enters by the pipe 10, passes through the pipe 11, and through the passage 12 in the piston 6 to the space below the piston. As the piston rises, the valve 9 also rises to close, by reason of air passing through the small passage 13 to the space below the valve. The piston rises until the passage 12 opens to the exhaust port 14, to release the air pressure below the piston. It then falls and opens the valve 9 by the pin 15. A heavy mass of metal 16 is adapted to slide in the mould, forming the top of the mould and, by its inertia, as well as by its static weight, to compress the material in the mould. For convenience in construction, plates 17 and 18, made to fit the mould closely, are placed above and below the material respectively. In the form of the apparatus shown in Figure 1, the mould is supported on the base 5a by four springs 19 between the bases 2 and 5a.

In operation, the mould is placed over the base 5, resting on the springs 19, and the plate 17 is inserted into it. The mould is then filled with material and the jolting device is operated to cause the material to settle in the mould. The plate 18 is then inserted and above it the mass 16, and the jolting device is then operated. As a result of the jolting, the whole apparatus, including mould walls 1 and 3, base 5 with plate 17 and mass 16 with plate 18, is raised repeatedly and allowed to fall. The base 5 receives a jolt by falling on the rigid base formed by the piston 6 contacting with the casing 7, but the mould walls 1 and 3 have their fall arrested by the springs 19, and the walls therefore compress the springs at the end of their fall and, in so doing, move downwards relatively to the mould bottom and the superincumbent material, which is supported thereon. It is found that, in consequence of this downward movement of the walls relative to the material, the pressure applied to the top of the mass of material is transmitted substantially in full to the lowest layers of the material.

Figure 3:
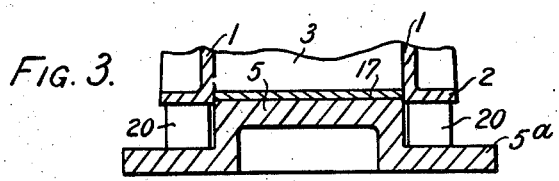
Figure 3 is a part section similar to that of Figure 1, showing an alternative form.

In the alternative form of apparatus shown in Figure 3, the mould walls are supported on the base 5a by distance pieces 20, and the apparatus is then jolted. The distance pieces 20 are then replaced by shorter distance pieces, and the apparatus is again jolted. During the latter jolting, the mould walls gradually descend until they rest on the distance pieces. The distance pieces can then be replaced by still shorter ones, and so on, until the mould walls have reached the base 5a. The series of distance pieces may be replaced by any convenient adjustable means, such as screw stops.

Alternatively, when the friction between the material already compressed by jolting and the mould walls is such that the mould walls descend only very slowly, the jolting may be continued uninterruptedly, after the full-length distance pieces 20 have been removed, until the mould walls have slowly descended to the base 5a.

Having described my invention, I declare that what I claim and desire to secure by Letters Patent is:

Apparatus for compressing pulverulent material into a block comprising mould walls, a mould bottom movable within and relatively to the mould walls, a mould top movable within and relatively to the mould walls, means for compressing the material consisting of a heavy mass resting freely on the mould top and a jolting device by which the mould bottom is raised and then allowed to fall and a yielding connection between the mould bottom and the mould walls of a stiffness sufficient substantially to prevent relative movement between the mould walls and the mould bottom during the rising movement of the mould bottom but insufficient to prevent such relative movement when the fall of the mould bottom is arrested.

JOSEPH GASKELL.